United States Patent
Marchevsky et al.

(10) Patent No.: US 8,995,637 B2
(45) Date of Patent: Mar. 31, 2015

(54) SYSTEM AND METHOD OF ADVANCED CALL ROUTING IN MASS TELEPHONY CONFERENCE CALLS

(71) Applicant: Tele-Town Hall, LLC, Arlington, VA (US)

(72) Inventors: Roman Marchevsky, Libertyville, IL (US); Vladimir Smelyansky, Glenview, IL (US)

(73) Assignee: Tele-Town Hall, LLC, Arlington, VA (US)

( * ) Notice: Subject to any disclaimer, the term of this patent is extended or adjusted under 35 U.S.C. 154(b) by 260 days.

(21) Appl. No.: 13/683,209

(22) Filed: Nov. 21, 2012

(65) Prior Publication Data

US 2014/0140492 A1 May 22, 2014

(51) Int. Cl.
*H04M 3/42* (2006.01)
*H04M 7/00* (2006.01)
*H04M 15/00* (2006.01)
*H04M 3/56* (2006.01)

(52) U.S. Cl.
CPC .................................... *H04M 3/56* (2013.01)
USPC ............ 379/202.01; 379/114.02; 379/221.13; 370/260

(58) Field of Classification Search
CPC ................ H04Q 2213/13138; H04M 3/42297; H04M 15/8044; H04M 2215/42

USPC ............ 379/202.01, 203.01, 204.01, 221.13, 379/114.02; 370/260, 261, 262
See application file for complete search history.

(56) References Cited

U.S. PATENT DOCUMENTS

| 6,330,311 | B1 * | 12/2001 | Mijares et al. | 379/112.01 |
| 6,606,668 | B1 * | 8/2003 | MeLampy et al. | 709/241 |
| 7,852,998 | B1 * | 12/2010 | Smith et al. | 379/202.01 |
| 8,600,027 | B1 * | 12/2013 | Doerr et al. | 379/202.01 |
| 2007/0121859 | A1 * | 5/2007 | Smelyansky et al. | 379/158 |
| 2014/0051383 | A1 * | 2/2014 | Doerr et al. | 455/405 |

* cited by examiner

*Primary Examiner* — Nafiz E Hoque
(74) *Attorney, Agent, or Firm* — Jean C. Edwards, Esq.; Edwards Neils PLLC

(57) ABSTRACT

The present invention relates to performing advanced call routing in a mass telephone conference call, including: checking a conferee list to determine whether a telephone number is a ported number; creating a list of carriers for each ported number on the conferee list, which provides a list of the carriers for each ported number; arranging the list of the carriers in order based upon cost, from least expensive to most expensive, for the call; placing the call to each conferee based upon the ordered list of the carriers, starting with the least expensive to the most expensive of the carriers for each ported number; and wherein when the least expensive of the carriers is unavailable, placing the telephone call to a next one of the carriers on the ordered list, from the least expensive to the most expensive of the carriers.

45 Claims, 4 Drawing Sheets

SYSTEM AND METHOD OF ADVANCED CALL ROUTING IN MASS TELEPHONY CONFERENCE CALLS

The present invention relates to a system and method of advanced call routing in mass telephony conference calls, to determine the least expensive carrier for each call.

BACKGROUND OF THE INVENTION

1. Technical Field

The present invention relates generally to telephony systems, and methods of call routing in conference calls. More particularly the invention relates to a system and method of mass dialing telephone conference participants using an advanced call routing system, to determine the least expensive carrier for each call.

2. Description of the Related Art

In telephony systems, a location routing number (LRN) is a unique number that has the format of a telephone number (TN), but represents an entire telephone switch through which multiple telephone numbers (TNs) are routed. In the United States, the LRN is a 10-digit number which follows the North American Numbering Plan (NANP). The LRN is stored in a database called a Service Control Point (SCP), which identifies a switching port for a local telephone exchange.

When a telephone number (TN) is dialed, since individual TNs are mapped to an LRN (referred to as a "subscription"), the local telephone exchange queries or "dips" a routing database, usually the SCP, for the LRN associated with the subscriber. The LRN removes the need for a public telephone number to identify the local exchange carrier.

Presently, subscribers want local number portability (LNP), which means that when a subscriber's phone service is moved from one service provider to another, the telephone number (TN) does not change. This process is called "porting" a number. Every ported TN must have an LRN assigned to it. Thus, if a subscriber changes to another telephone service provider, the current telephone number (TN) can be retained, and only the LRN needs to be changed. A neutral company has been chartered with developing and maintaining the Number Portability Administration Center (NPAC) to support the implementation of Local Number Portability (LNP).

In addition to supporting service provider phone number portability to a subscriber, an LRN also supports the possibility of two other types of number portability: service portability (for example, ordinary service to ISDN) and geographic portability.

Presently, the particular carrier for an individual call is chosen based on a system called least-cost-routing (LCR). This system is well-known in the art, and is widely used for routing telephone calls by telecommunication companies. In voice telecommunications, LCR is the process of selecting the path of outbound communications traffic based on cost. Within a telecommunications carrier, an LCR team might periodically (monthly, weekly or even daily) choose between routes from several or even hundreds of carriers for destinations across the world. This function might also be automated by a device and/or software program known as a "Least Cost Router", which performs in real-time.

The portability of telephone numbers impacts the LCR system. In particular, mobile number portability affects internet telephony, voice-over-IP (VoIP) telephony, and LCR companies. Just as it is possible to port a land line telephone number, mobile phone numbers are also portable when changing service providers. With telephone number portability in place around the world, LCR providers can no longer rely on using only a portion of the dialed telephone number to route a call. Instead, they now have to determine the actual current network of every number before routing the call. Thus, LCR solutions also need to handle telephone number portability when routing a voice call.

In mass telephone conferencing systems, it appears that more and more telephone calls are made to ported phone numbers. It is estimated that of the close to 500 million ported telephones in the United States, approximately 40% of telephone calls are made to ported phone numbers. Thus, a method and system of advanced call routing, to ensure that calls are routed to a lower cost carrier, would be advantageous.

SUMMARY OF THE INVENTION

The present invention relates to a system and method of advanced call routing in mass telephony conference calls, to determine the least expensive carrier for each call.

The present invention relates to performing advanced call routing in a mass telephone conference call, including: checking a conferee list to determine whether a telephone number is a ported number; creating a list of a plurality of carriers for each ported number on the conferee list, which provides a list of the plurality of carriers for each ported number; arranging the list of the plurality of carriers in order based upon cost, from least expensive to most expensive, for said telephone call; placing the call to each conferee based upon the ordered list of the plurality of carriers, starting with the least expensive to the most expensive of the plurality of carriers for each ported number; and wherein when the least expensive carrier is unavailable, placing the telephone call to a next one of the plurality of carriers on the ordered list, from the least expensive to the most expensive of the plurality of carriers.

In one embodiment, the telephone conferencing controller accesses a national database of ported numbers, to determine whether the telephone number is ported. The national database may be accessed in real-time.

In one embodiment, the national database is accessed prior to the telephone call or in real-time.

In one embodiment, the telephone conferencing controller accesses a database to locate pricing of telephone calls for each of the plurality of carriers. When the pricing is not stored in the database, the database may be located with a corresponding one of each of the plurality of carriers. In one embodiment, the database of each of the plurality of carriers is searched in real-time for the pricing.

In one embodiment, when the telephone number is not a ported number, and is based on a dialed number, charges for the telephone call are based on least-cost-routing.

In one embodiment, the ported number is ported from one of a land line to a mobile phone, one carrier to another carrier, or from one carrier in one geographic area to another geographic area.

In one embodiment, the telephone number is identified as ported based upon its location routing number.

In one embodiment, a cost for the telephone call is based upon one of a predetermined charge, a dialed number, or a predetermined number of digits of the telephone number.

In one embodiment, the plurality of carriers charge based upon one of a dialed number, the ported number, or a flat rate.

In one embodiment, the teleconferencing controller analyzes a cost of the telephone call, the analysis which is performed in a predetermined order.

In another embodiment, when the number is ported, the teleconferencing controller divides the plurality of carriers into groups, the groups which provide a predetermined cost to call each ported number.

In another embodiment, the teleconferencing controller creates the list of said plurality of carriers and arranges the list of the plurality of carriers in order based upon cost within each group, from least expensive to most expensive, for the call.

In another embodiment, the teleconferencing controller creates a single merged list of the plurality of carriers from the groups ordered by cost, from least expensive to most expensive is created; and then places the telephone call to each conferee on the conferee list based upon the merged list of the plurality of carriers, starting with the least expensive to the most expensive of the plurality of carriers for each ported number.

In one embodiment, the merged list of the plurality of carriers from the groups is created in order by cost, such that the telephone call is placed in parallel processes, based upon the order by cost, and based upon availability of the plurality of carriers at a time of the telephone call.

In one embodiment, when one of the plurality of carriers is unavailable, the teleconferencing controller proceeds to a next one of the plurality of carriers in order of cost, from cheapest to most expensive.

In one embodiment, the teleconferencing controller stops at a predetermined one of the plurality of carriers.

In one embodiment, the merged list is prepared in advance of the telephone conference call, or it can be prepared in real-time during the telephone call.

Thus has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DETAILED DESCRIPTION OF THE INVENTION

The present invention relates to a system and method of advanced call routing in mass telephony conference calls, which determines the least expensive carrier for each call.

The present invention utilizes the apparatus and methods described in U.S. patent application Ser. No. 13/064,694 filed Apr. 6, 2011, Ser. No. 12/556,838 filed Jul. 30, 2010, Ser. No. 12/805,849 filed Jul. 30, 2010, and Ser. No. 11/558,647 filed Nov. 10, 2006, and U.S. Pat. Nos. 7,944,861, and 7,852,998, all of which claim priority from U.S. Provisional Application No. 60/510,925 filed Oct. 14, 2003, the contents of all of which are herein incorporated by reference in their entirety.

Conferencing System Hardware High Level Architecture

Figure 1:
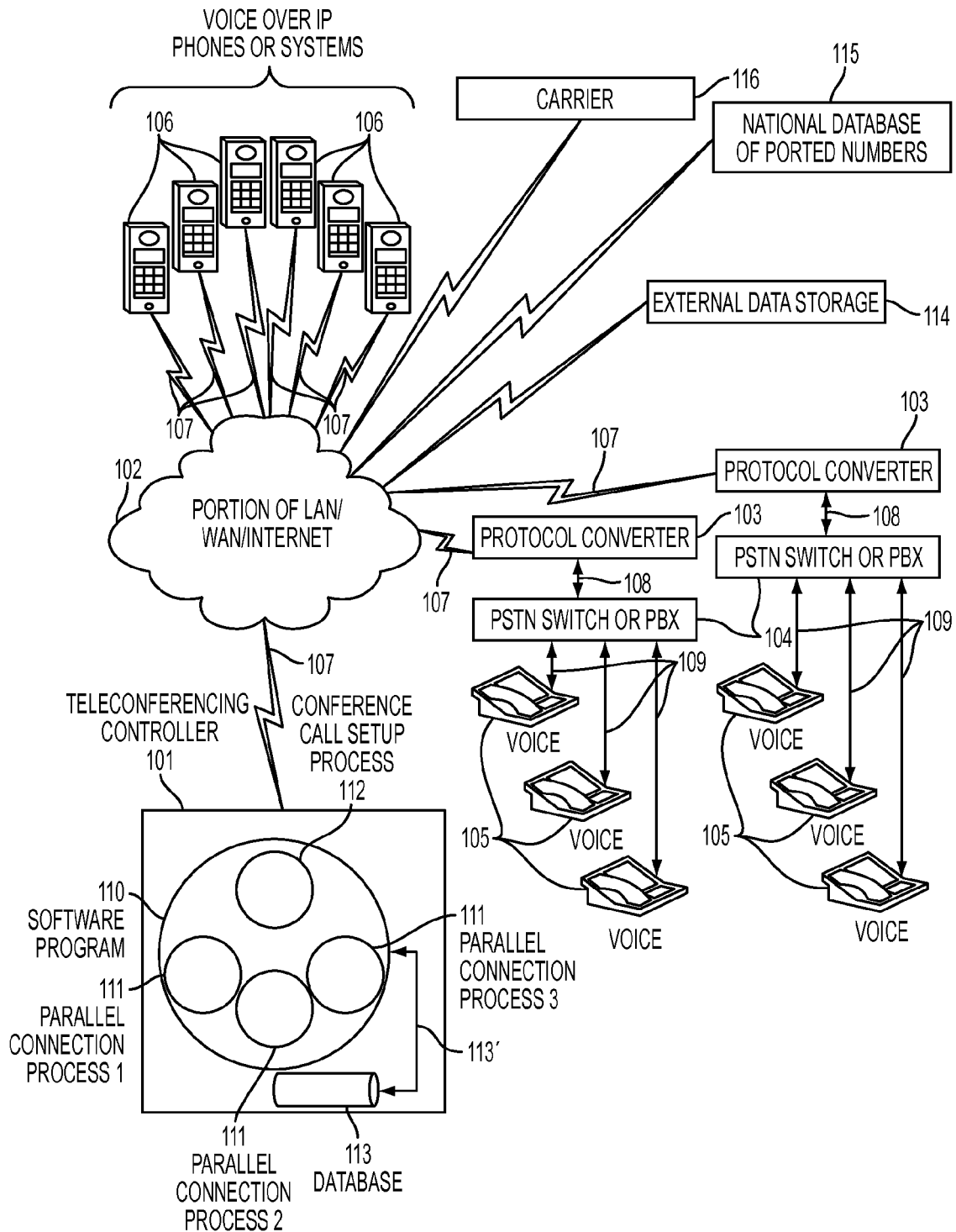
FIG. 1 is schematic diagram of the major components of the telephone conferencing system according to one embodiment consistent with the present invention.

The present invention utilizes the apparatus and methods described in the above related U.S. patents and patent applications, and generally includes at least partially the elements shown in FIG. 1.

The teleconferencing controller 101 resides in a computer system (not shown), such as a client computer or a server, and teleconferencing operations may be managed by an operator at an imaging display device that is capable of providing high resolution digital images in 2-D or 3-D, for example. The operator inputs commands to a user interface through a programmable stylus, keyboard, mouse, speech processing device, touch screen, or other input device.

While the system of the present invention may be described as performing certain functions, one of ordinary skill in the art will readily understand that the software program 110 may perform the function rather than the entity of the system itself. Further, the software program 110 may include separate software programs 110 having code that performs desired operations. The software program 110 may include a plurality of modules that perform sub-operations of an operation, or may be part of a single module of a larger software program 110 that provides the operation.

According to one embodiment of the invention, the data storage device 113 where the conferee list is stored, may include a database, such as a centralized database and/or a distributed database that are connected via a network (i.e., Internet 102), and the databases may be computer searchable databases, or may be relational databases. The data storage device may be coupled to a server and/or client computer, either directly or indirectly through a communication network, such as the LAN/WAN/Internet, and/or other networks.

According to one embodiment of the invention, the computer system of the present invention may be coupled to other client computers or servers. According to one embodiment of the invention, the computer system may access administration systems, billing systems and/or other systems, via a communication link, including a wired and/or wireless communication link, a switched circuit communication link, or may include a network of data processing devices such as the LAN/WAN/Internet, or combinations thereof.

According to one embodiment, the present invention may be implemented using software applications that reside in a client and/or server environment. According to another embodiment, the present invention may be implemented using software applications that reside in a distributed system over a computerized network and across a number of client computer systems. Thus, in the present invention, a particular operation may be performed either at the client computer, the server, or both.

Further, although the above-described features and processing operations may be realized by dedicated hardware, or may be realized as programs having code instructions that are executed on data processing units, it is further possible that parts of the above sequence of operations may be carried out in hardware, whereas other of the above processing operations may be carried out using a software program.

The underlying technology allows for replication to various other sites. Each new site may maintain communication with its neighbors so that in the event of a catastrophic failure, one or more servers may continue to keep the applications running, and allow the system to load-balance the application geographically as required.

Further, although aspects of one implementation of the invention are described as being stored in memory, one of ordinary skill in the art will appreciate that all or part of the invention may be stored on or read from other non-transitory computer-readable media, such as secondary storage devices, like hard disks, floppy disks, CD-ROM, or other forms of ROM or RAM either currently known or later developed. Further, although specific components of the system have been described, one skilled in the art will appreciate that the system suitable for use with the methods and systems of the present invention may contain additional or different components.

The software program 110 of the present invention operates to control teleconferencing controller 101 at a telephone conferencing provider. Software program 110 contains a conference call setup process 112, which is triggered when software program 110 detects a condition indicating that a conference call should be started. Additionally, software program 110 controls the existence and operation of all of n instances of parallel connection processes 111, which dials out calls to n recipients, inviting them to attend the telephone conference. Available for access by software program 110 operating (and preferably residing within teleconferencing controller 101) is conferee list stored in a database 113. Communications between software program 110 and conferee list 113 occurs through communications path 113'.

Teleconferencing controller 101 is connected to, and communicates with, a portion of a LAN/WAN/INTERNET 102 network through a data network using a "voice-over-internet-protocol" (VoIP), or similar protocol via data network path 107. Note that, while only a single connection is shown in FIG. 1 for the sake of simplification, in actual practice, for the sake of redundancy and efficiency, one or more additional parallel connections are typically used to connect these two entities.

As shown in FIG. 1, a plurality of VoIP phones or systems 106 may be connected, each through a data network path 107, to a portion of the same LAN/WAN/INTERNET 102 network. Through these connections, teleconferencing controller 101 can communicate with these devices or systems. As shown in FIG. 1, it can be seen that a plurality of protocol converters 103 can also be connected to a portion of LAN/WAN/INTERNET 102, each through a data network path 107. Each protocol converter 103 handles the translation of signals and data formats between the selected VoIP (or similar) protocol and a telephony PSTN switch or PBX 104. Each protocol converter 103 communicates with its associated PSTN switch or PBX 104 through a telephony interface path 108. Note that while a one-to-one relationship is shown as an example in FIG. 1 between a protocol converter 103 and an associated PSTN switch or PBX 104, a single protocol converter 103 can communicate with more than one associated PSTN switch or PBX 104, and conversely a single PSTN switch or PBX 104 can communicate with more than one protocol converter 103.

Finally, in FIG. 1, it is shown that each PSTN switch or PBX 104 communicates with each of a plurality of traditional voice telephones 105 through a switch-to-phone interface 109. This link represents any of the available well known standard telephony interfaces between switching systems and telephones as well as any privately held proprietary interface between a telephony switch and its associated telephone base.

It is important to note that while both VoIP (or similar) protocol phones and standard PSTN voice phones are shown in FIG. 1 to indicate that both can be accommodated simultaneously, the methods of the present invention are not limited to these specific protocols, and can be practiced using any one or more of the available communications protocols.

The software program 110, along with a conference call setup process 112 and one or more parallel connection processes 111, operates to control the actions of teleconferencing controller 101, actuating the methods, functions and features such as mass telephone conferencing calls etc.

While one or more conferee lists are stored in a data storage medium 113 accessible to software program 110 operating on teleconferencing controller 101, these conferee lists are not necessarily stored physically within the hardware of teleconferencing controller 101, since well-known techniques in network technologies allow each of the lists to reside at any accessible network node or external storage system 114. Each stored conferee list defines the targeted conferees for a pre-defined conference call, along with detailed parameters related to each targeted conferee. Some or all of the conferee-specific elements shown in Table 1 are stored for each conferee in each database 113.

TABLE 1

Contents of conferee list

| LIST ELEMENT | DESCRIPTION |
| --- | --- |
| Conferee ID | Used as a key to link connection statistics to this conferee. |
| Conference call ID list | A list of the IDs of conference calls to which this conferee is assigned. |
| Remote Cache | A network resource identifier that specifies where this conferee's data is locally stored. |
| Conferee name | The name of the person who is a target conferee. |
| Conferee language | The spoken language in which any interactive messages will be delivered to this conferee. |
| Message mask | A bitmapped filter that identifies which messages will be delivered to the target conferee under various circumstances. |
| Conferee telephone number | PSTN telephone number that will be used to contact conferee when using classic voice telephone connection. |
| Alternate telephone number | Alternate PSTN telephone number that can be used to contact this conferee. |
| Network address | The network address to use for connecting this conferee when using VoIP (or similar) protocol. |
| Preferred contact protocol | The preferred protocol (PSTN, VoIP, etc.) to use when contacting this conferee. |
| Preferred network | The preferred network to use when attempting to contact this conferee. |
| Preferred switch/PBX | The preferred telecommunications switch or PBX to use when attempting to contact this conferee. |

Conferencing Controller Software Overview

Figure 2:
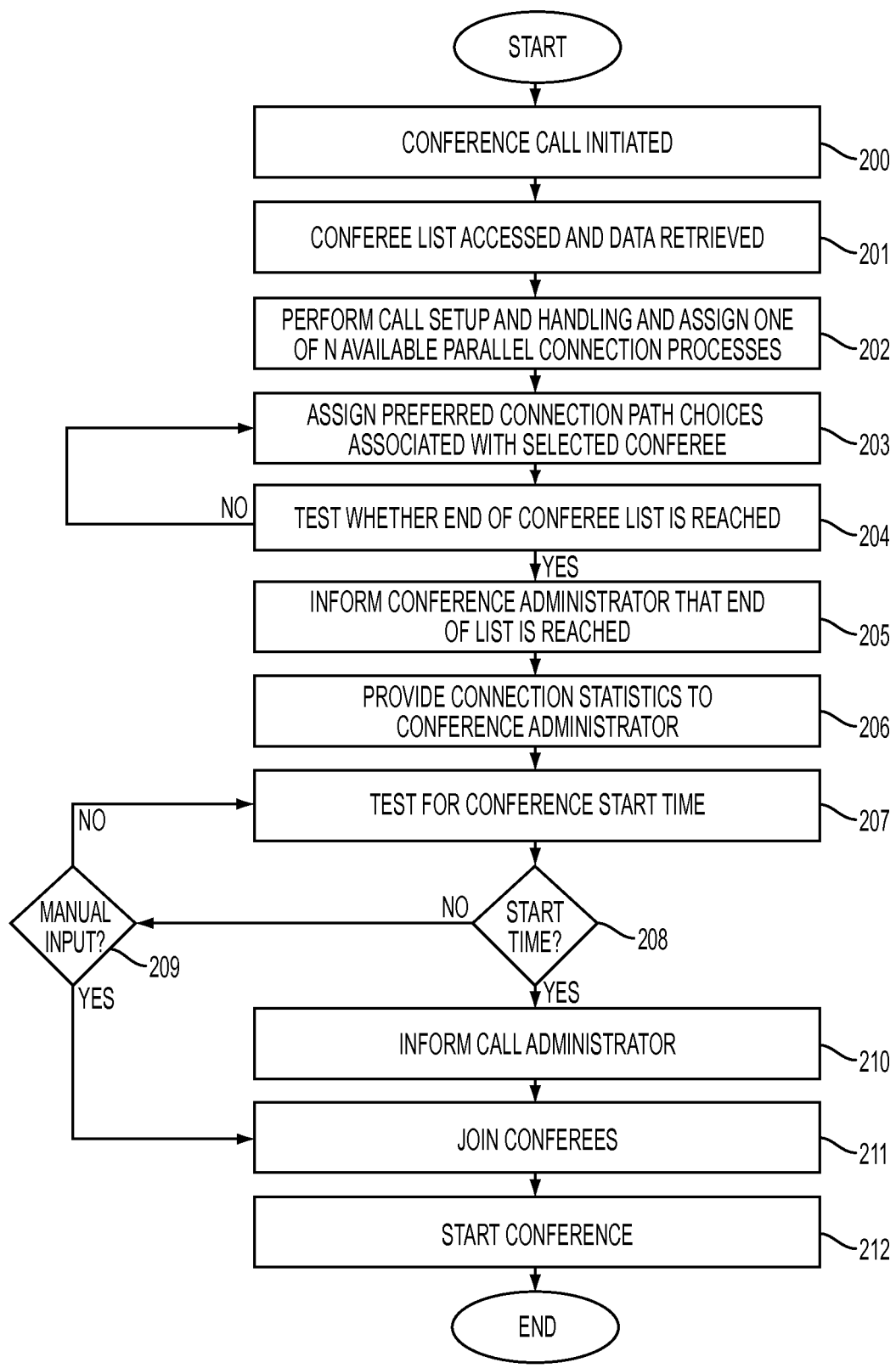
FIG. 2 is a flowchart of the major steps in performing a mass telephone conference call utilizing a system of the present invention.

Now referring to the simplified software flowchart in FIG. 2, it can be seen that in the conference call setup process 112 of software program 110 (operating to control teleconferencing controller 101), there has been a trigger event or condition detected indicating that a conference call is to be initiated, in step 200.

The specific method of detecting and interpreting an initiating trigger event or condition and the specific method of identifying the applicable conferee list in step 201, is omitted from this description of the invention, but is disclosed in U.S. Pat. Nos. 7,944,861, and 7,852,998, for example. The present invention contemplates that any number of methodologies or approaches can be used as may be appropriate in particular situations.

Generally, however, the present invention accommodates the initiating trigger and identification of the appropriate conferee list from database 113 in many forms, such as the reception of a call from the conference call initiator, or automatic selection of the associated conferee list accomplished by computer software program 110 when it recognizes that a predefined call initiation time has arrived. Additionally, a user operating a network interface (traditionally, a web browser) can access an Internet or intranet web page where an option exists to trigger a conference call to any of a selection of conferee lists, which is a trigger to initiate a conference call setup process 112 for the specified conferee list.

In the flowchart of FIG. 2 it can be seen that the beginning of conference call setup process 112, the software program 110 accesses a pre-defined conferee list in database 113 that includes individual conferee parameters, including telephone numbers of the participants. Once conferee list 113 has been accessed, and the relevant data retrieved, conference call setup process 112 proceeds to gather and record individual conferee connection status data from each of the parallel connection processes 111.

At this point, conference call setup process 112 of the software program 110 steps sequentially through the entries of conferee list, and for each participant or conferee on the list, assigns one of n available parallel connection processes 111 to manage establishment of maintenance of a connection to the selected conferee, in step 202. In this manner, conference call setup process 112 is able to generate a simultaneous dial-out to some or all of the entries of conferee list 113 (since each of the assigned parallel connection processes 111 can proceed to connect to its assigned conferee without respect to any processing delays related to connection to any other target conferee). Note that to improve overall connection time coordination (i.e., minimizing the time that will elapse between connection of the first conferee to a conference call and the connection of the last conferee to the same call), this may require that connection times are slowed down (increased) for specific conferees to ensure that their actual connection time coincides with the connection times of other conferees.

Specifically, conference call setup process 112 selects the next conferee on the conferee list. Once this is accomplished (and the associated data has been acquired for the selected conferee), conference call setup process 112 proceeds to the call setup and handling for the selected conferee, which is passed to one of n available parallel connection processes 111, in step 202. Along with this assignment, conference call setup process 112 passes to this instance of parallel connection process 111 any preferred connection path choices associated with the selected conferee that were retrieved from conferee list in database 113, in step 203. The details of step 203 will be discussed in more detail below with respect to FIGS. 3 and 4.

Once the call setup and handling for the selected conferee has been passed to an available parallel connection process 111, conference call setup process 112 proceeds to test whether the end of conferee list has been reached in step 204. If the test shows that there are more entries of conferee list 113 yet to be processed, conference call setup process 112 returns to selection of the next conferee on the conferee list in step 203. Otherwise (all entries of the conferee list have been processed), conference call setup process 112 proceeds to inform the conference call administrator that the end of conferee list has been reached, in step 205. Software program 110 also makes available to the conference call administrator, those connection statistics related to the call, in step 206. These statistics may include information about how many conferees are currently connected, have accepted an invitation to the call and are waiting for the call to begin.

Once this is accomplished, conference call setup process 112 proceeds to monitor conditions to determine whether to begin the conference portion of the call.

Specifically, conference call setup process 112 tests whether a predefined conference call start time has arrived, in step 207. If this time has not arrived, as in step 208, conference call setup process 112 accepts any manual input signals that indicate whether a manual command to start the conference portion of the call has been received (for example, a traditional dual tone multi-frequency (DTMF) signal from one of the conferees or the call initiator), in step 209. Once this test is completed, conference call setup process 112 waits for the start time if a manual command to start the conference portion of the call has not been received, in steps 208, and 210-211. However, if a manual command to start the conference portion of the call has been received, conference call setup process 112 proceeds to start the conference call, in step 211.

Thus, if the software program 110 determines that a predefined start time for the conference call has arrived, in step 208, conference call setup process 112 informs the call administrator, in step 210, that the start time for the call has arrived and the conference portion of the call is about to begin. Once this is done, conference call setup process 112 proceeds to send a master call start signal simultaneously to every parallel connection process 111, in step 211, thus causing all conferees to enter the conference portion of the call. Once all connected conferees are placed in conference mode, conference call setup process 112 delivers an announcement simultaneously to all connected conferees that the conference call is now starting and the start time of the conference portion of the call is recorded, in step 212.

The steps for ending the teleconference will not be provided herein, as those steps have been disclosed in U.S. Pat. Nos. 7,944,861, and 7,852,998, for example.

Advanced Call Routing During Teleconference Setup and Handling

Specifically, the present invention provides for a novel apparatus and method of advanced call routing during a telephone conference—particularly a mass telephone conferencing. With reference to the flowchart of FIG. 3, during the dial out portion of the call setup and handling, the software program 110 of the teleconferencing controller 101, or a separate controller (not shown), dials out to conference participants. The software program 110 of the teleconferencing controller 101 determines how carriers are selected to place calls (i.e., by cost) in the most effective way. This usually involves the incorporation of the location routing number (LRN), which is the unique number that has the format of a telephone number (TN), but represents an entire telephone switch through which multiple telephone numbers (TNs) are routed.

As stated in the Background section, the particular carrier for an individual call is chosen based on least-cost-routing (LCR). Within a telecommunications carrier, an LCR team might periodically (monthly, weekly or even daily) choose between routes from several or even hundreds of carriers for destinations across the world. This function might also be automated by a device and/or software program known as a "Least Cost Router", which operates in real-time.

The choice of carriers is especially important in mass telephone conferencing systems, since more and more telephone calls are made to ported phone numbers (approximately 40% of the close to 500 million ported telephone numbers in the United States). The portability of telephone numbers impacts the LCR system, since LCR providers can no longer rely on using only a portion of the dialed telephone number to route a call. Instead, they now have to determine the actual current network of every number before routing the call. Normally, LCR providers can cherry-pick the carriers by determining when a carrier defines a code range as being a fixed-line and less expensive, as compared to other carriers which define that code range as mobile and more expensive.

For example, the charges for telephone calls dialed out to conference participants, can be based on a Dialed Number (DN), or on how the number was ported. For example, one can port a land line telephone number (i.e., home number) to a mobile phone. The termination to the mobile telephone number can be charged based on the original telephone number (i.e., land line DN—some carriers still do this), or on where the telephone number was ported (i.e., mobile telephone, which may have higher rates). As stated above, the difference in price can be significant. Thus, a method and apparatus of advanced call routing, to ensure that calls are routed to a lower cost carrier, especially in a mass telephone conferencing activity, would be advantageous.

In the methods of the present invention, the software program 110 of the teleconferencing controller 101, in step 203, where the preferred connection path is determined, is tasked with whether or not the telephone number of the participant it is calling, was ported.

Figure 3:
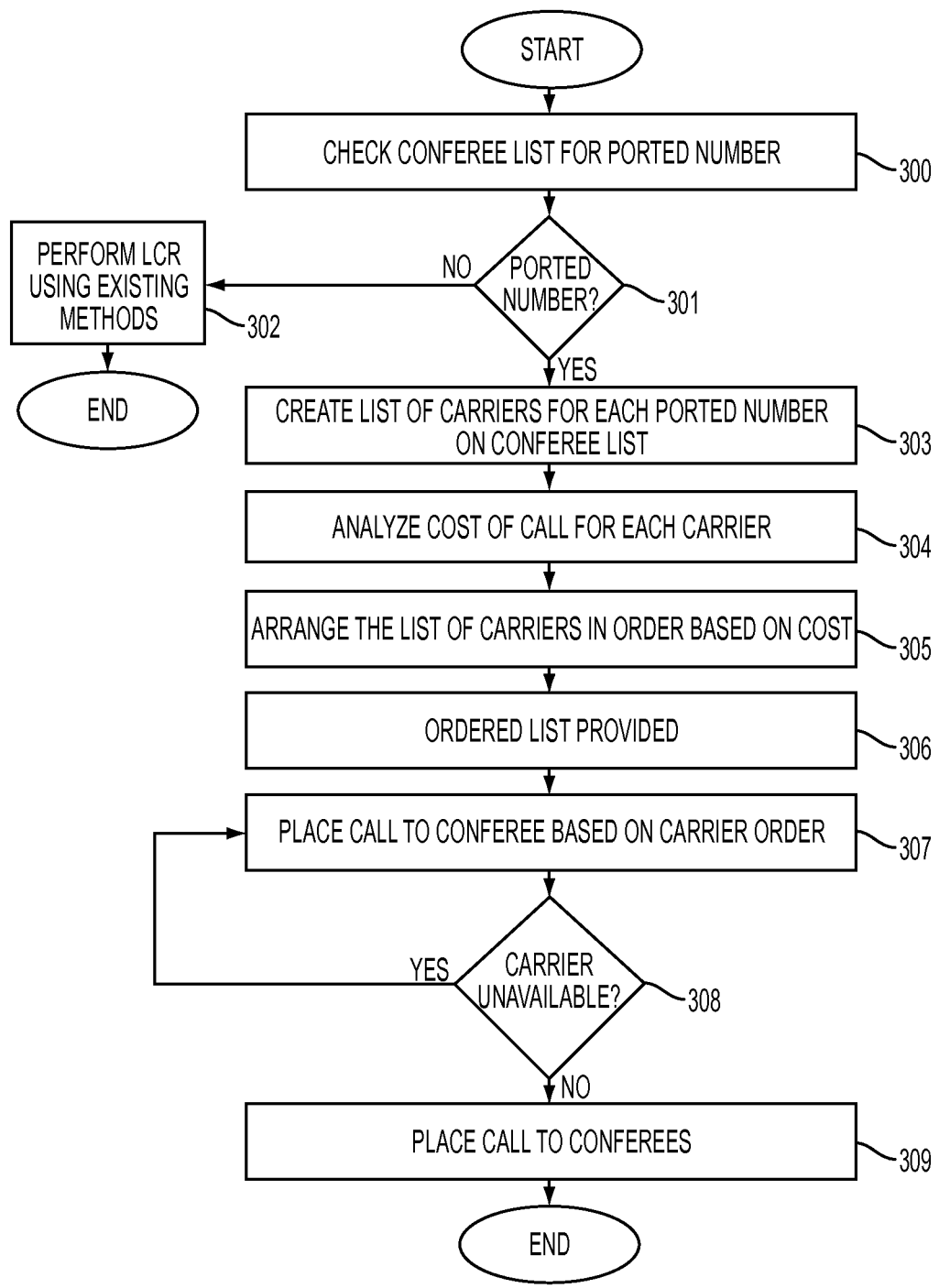
FIG. 3 is a flowchart of the major steps in advanced call routing according to one embodiment consistent with the present invention.

With respect to carriers, telephone numbers can be ported from one carrier to another carrier, or with a single carrier from one geographic area to another geographic area. Thus, as shown in FIG. 3, in step 300, the software program 110 checks the conferee list and compares the telephone numbers to a list of ported numbers, by checking them against the national database 115 which stores the ported numbers, according to their LRN. The national database 115 which stores the ported numbers, changes and updates daily; accordingly, checks of the numbers daily is advisable.

If the conference participant's telephone number was not ported, and the call to the conference participant will be placed as a dialed number (DN), the cost of the call is identified by the teleconferencing controller 101 in the traditional way (i.e., using LCR), in step 302, and carriers are ordered for each of the telephone numbers of the participants, in real-time, based upon existing call routing methods.

Thus, the particular carrier for that individual call is chosen by the software program 110 of the teleconferencing controller 101, and the software program 110 will utilize least cost routing (LCR). In this manner, the software program 110 of the teleconferencing controller 101, routes calls based on the dialed number (DN), to the lowest price carrier. If that carrier fails, for whatever reason, the software program 110 "route advances" the call to the next lowest price carrier, and so on.

However, in the case of mass telephone conferencing, issues of how to accomplish LCR when an extremely large number of calls to conferees must be made near simultaneously, particularly when the numbers are ported, arise.

Thus, in one embodiment consistent with the present invention, the teleconferencing controller 101 allows for telephone conferencing, particularly mass telephone conferencing, utilizing multiple carriers in parallel. In one example, there are a plurality of carriers (i.e., 12 carriers), whose prices are stored in the conference company's database 113, 114. The prices with each carrier are stored in database 113, 114 as they are specified with the carrier on a predetermined basis, but those prices may change at any time (i.e., with a predetermined amount of notice). The prices for the telephone calls to the teleconference conferees can be based on a predetermined charge (i.e., flat rate), or based on the dialed number (DN), or the first six (6) or seven (7) digits of the telephone number (area code and exchange). In addition, prices for telephone calls to the conference participants may be based on which area of the city is being called, or whether the telephone number is a land line or mobile telephone number (i.e., original number vs. ported number), or based on predetermined pricing (i.e., flat rate) by the carrier itself.

For example, predetermined charges (i.e., flat rate) may be two cents per minute nationwide by a particular carrier for an original land line number, or one cent per minute for a ported number. In another example, although numbers with the first 6 digits may normally have the same price at a single carrier, since the same phone switch (Optical Channel Monitor (OCM)) is used, if the carrier has different switches in the same building, this fact may lead to different pricing.

In another embodiment, the prices are not stored in database 113, 114 as a pre-ordered list, which is pulled up by the software program 110 of the teleconferencing controller 101, but can be also searched in real-time at the carrier's database 116 which has real-time access (see FIG. 1). (Note that although only a single carrier is shown in FIG. 1, one of ordinary skill in the art would know that a plurality of carriers can be accessed in this manner.)

Thus, the software program 110 of the teleconferencing controller 101 accesses the conferee list 113 and the list of telephone numbers to dial, and then accesses the national database 115, to determine which of the numbers are ported numbers, in step 300 (see FIG. 3).

When the teleconferencing controller 101 goes through the conferee list and determines which of the telephone numbers of the conference participants to be dialed are ported in step 301, in order to obtain the least expensive call (particularly for mass telephone conferencing).

In one embodiment, for example, a conferee list of 100 numbers is checked by the teleconferencing controller 101 to determine which numbers are ported. The teleconferencing controller 101 will take the first number on the list and if the number is ported, will create an association of that number (i.e., a six digit code and exchange) with the ported number. In other words, the teleconferencing controller 101 will relate a second number such as, for example, an LRN to the ported number. For each such second number, the teleconferencing controller 101 will check the databases of a plurality of carriers to determine the cost of each carrier to make the conference call, as follows. If the carrier uses a flat rate, the teleconferencing controller 101 will list that rate; if the carrier uses a dialed number (DN) rate, the teleconferencing controller 101 will list that rate; if the carrier uses a ported number rate, and the association related to the second number by the teleconferencing controller 101 is empty (i.e., the original number is not ported), then the teleconferencing controller 101 will use the original number to identify the cost (i.e., allocate a rate); and if the carrier uses a ported number rate, and the association with the original number is provided (i.e., a second number is provided), then the teleconferencing controller 101 will list the ported number rate. Thus, a list of carriers is created by the teleconferencing controller 101 for each ported number, in step 303. The teleconferencing controller 101 then analyzes the cost of a call for each carrier and their rates are thus determined, in step 304. This is performed for each of the 100 numbers. Thereafter, the carriers can be sorted or arranged in order based on cost by least expensive to most expensive for each of the 100 numbers (see step 305), such that an ordered list is provided (see step 306). The teleconferencing controller 101 can then proceed to dial the numbers using the least expensive carrier, as in step 307.

For example, a particular carrier may have received all the orders for telephone calls it is allowed, and the teleconferencing controller 101 must proceed to the next cheaper carrier, in order, using a novel form of advanced call routing methods (i.e., return to step 307). Thus, the actual telephone call placed by the teleconferencing controller 101 to a particular participant using the first carrier on the list, if the call fails due to lack of availability at the carrier, will now be placed to the second cheaper carrier, in accordance with the advanced call routing methods of the present invention (see step 308). In some cases, depending on the type of failure and the teleconferencing company's policy, the teleconferencing controller 101 may stop at one carrier, or proceed to as many carriers as possible (e.g., seven (7) carriers) to locate the cheapest carrier for that call. The calls to the different carriers are carried out over different parallel communication paths, by the teleconferencing controller 101, in step 309.

In one example, a political rally telephone conference call is arranged by the teleconferencing company in Washington D.C., to a plurality of conferees on a conferee list. In this example, a telephone conference call to a participant in Chicago, Ill., uses AT&T® dialed (i.e., DN), and Verizon® if the telephone number is ported. Thus, the teleconferencing controller 101 will first determine if the telephone number is ported, from a check of database 116, based on the LRN. This lookup can be local, remote, or even third-party. Since the teleconferencing company knows the names and telephone numbers of the persons being called, the teleconferencing controller 101 can take those telephone numbers to see if they are ported, and this information will be known prior to the call, such that the list is configured prior to dial-out.

The teleconferencing controller 101 then prepares a list of carriers according to the methods described above, from a pre-ordered list of carriers, stored in database 113, or by searching in real-time at the carrier's database 116 by the software program 110.

Specifically, the teleconferencing controller 101 can thus, check either: 1) the database 113 for predetermined charges for AT&T® and Verizon® to call the telephone number (either DN, ported, or flat rate charges), or 2) check in real-time, the databases 116 of the two carriers for their charges to dial the telephone number, based on the first 6 digits of the telephone number (i.e., 703-466) (i.e., DN, ported, or flat rate charges). Assuming there is no flat rate for this call at either carrier stored at database 113, the teleconferencing controller 101 would pull up a dialed number charge (DN) at AT&T®, and a ported number charge at Verizon®.

If the dialed telephone number (DN) charges are lower than those charged for the ported telephone number, then the teleconferencing controller 101 will dial the conferee using carrier AT&T® first. However, if that call fails due to lack of availability, for example, when AT&T® is unavailable, then the teleconferencing controller 101 will dial the second cheapest carrier—Verizon® (i.e., ported number charge).

Since a mass telephone conference is known ahead of time (e.g., 2 hours or more), in one embodiment consistent with the present invention, an ordered list of carriers can be compiled by the teleconferencing controller 101, such that the calls can be made using the least expensive carrier, according to the above advanced call routing methods of the present invention, when the time comes for dial-out.

However, in another embodiment consistent with the present invention, instead of creating an ordered list of carriers in advance, the teleconferencing controller 101 can determine the actual LRN status of the particular telephone number being dialed, during the call in real-time. Thus, the lookup of the LRN status of the telephone number by the teleconferencing controller 101, is performed either prior to, or during the actual call such that no extra time is lost during the telephone call to the participant, and the LRN status is stored directly with the telephone number (TN) in the dialed conferee list for a particular event (i.e., teleconference).

Thus, the teleconferencing controller 101 can create the ordered list of carriers in real-time, by finding the lowest cost carrier, and placing the call through that carrier. If that call through the lowest cost carrier fails, then the novel advanced call routing of the present methods and apparatus, will locate the next carrier, etc., until the calls are made through the parallel processes to all participants on the conferee list. Thus, the telephone conference calls are performed in mass telephone conferencing by the teleconferencing controller 101, to ensure that the lowest cost is paid to call all the conference participants.

Figure 4:
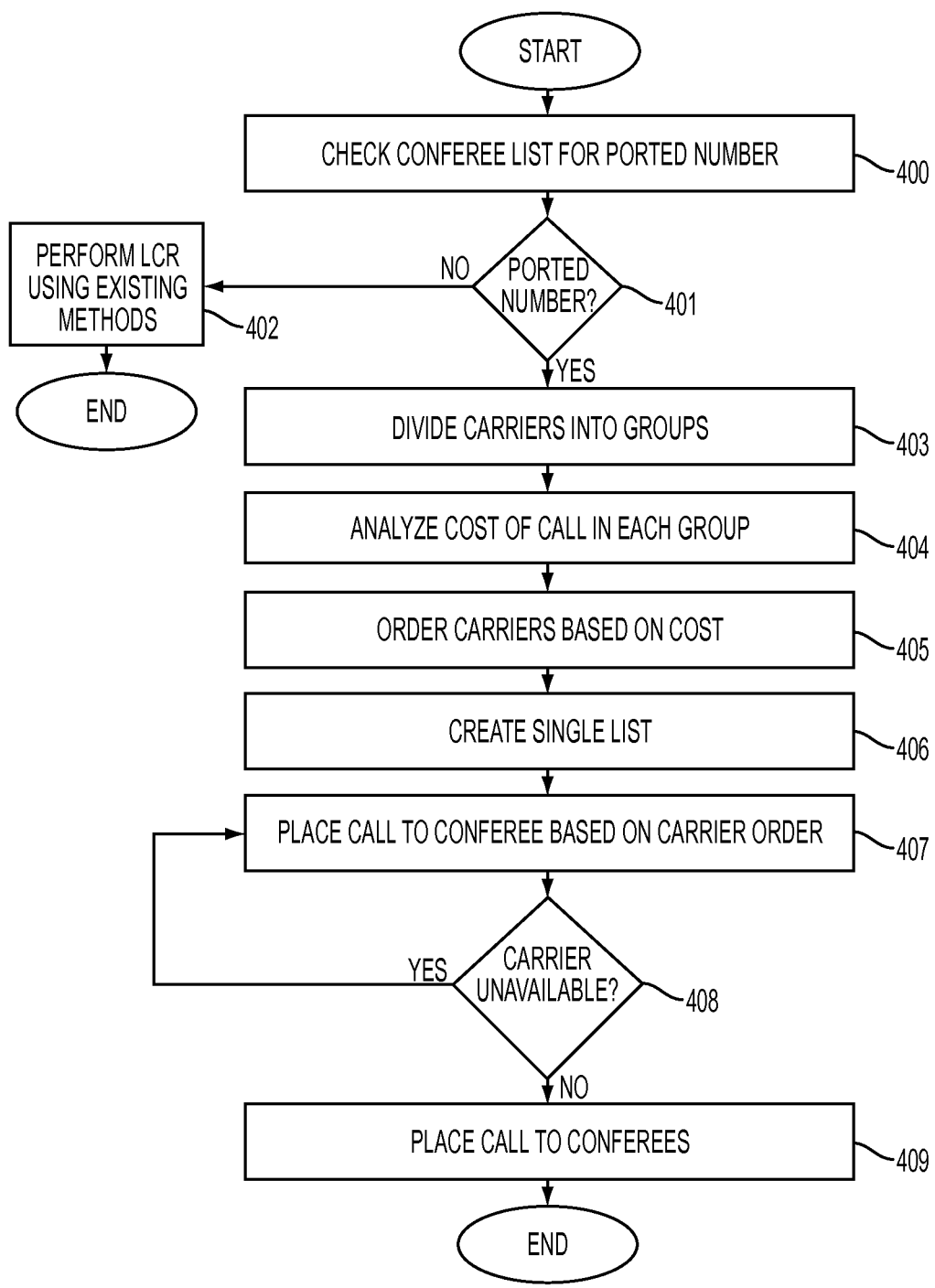
FIG. 4 is a flowchart of the major steps in advanced call routing according to another embodiment consistent with the present invention.

FIG. 4 illustrates another embodiment consistent with the present invention where the teleconferencing controller 101 divides the carriers into a plurality of groups in step 403, before checking each of the 100 numbers in the above example. For example, one group may contain carriers that are charging based on dialed number (DN), another group may contain those carriers that charge based on the ported number, and still another group may contain those carriers that charge a flat rate.

The teleconferencing controller 101 than analyzes the cost of the telephone call, for each of the 100 numbers, starting from the first number, in each of the groups, in step 404, based on the dialed number (DN) first, and then the ported number, second, and the flat rate last, (or in any predetermined order), to determine which of the routes is cheaper to call. The software program 110 of the teleconferencing controller, then orders the carriers in step 405, and thus, the calls, from cheaper to more expensive within each group.

After the cost is determined by the teleconferencing controller 101, the software program 110 of the teleconferencing controller 101 creates a single merged list of carriers from the groups in step 406, in order by cost, and then the actual call to a conference participant is placed by the teleconferencing controller 101 in parallel processes, in step 407, to each of the 100 numbers based upon that order, and based upon carrier availability at the time of the telephone call. The steps 400-402 and steps 407-409 are the same as the corresponding steps 300-302 and steps 307-309 in the embodiment described above with respect to FIG. 3, and thus will not be explained again for the sake of brevity.

Accordingly, the above apparatus and methods of advance call routing in a mass telephone conferencing call according to the present invention, uses an ordered list of carriers using an apparatus and methods to determine the least expensive carrier, and which can pre-order, or order that list in real-time, and which is extremely effective in lowering the costs of mass telephone conferencing.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

The invention claimed is:

1. An apparatus which performs advanced call routing in a mass telephone conference call, comprising:
 a telephone conferencing controller which contains a memory having a software program which performs the following steps:
  checking a conferee list that includes a plurality of telephone numbers to determine whether a telephone number in the conferee list is a ported number;
  creating a list of a plurality of carriers for each said ported number on said conferee list, which provides a list of said plurality of carriers for each said ported number;
  arranging the list of said plurality of carriers in order based upon cost, from least expensive to most expensive, for said telephone call;
  placing said telephone call to each conferee on said conferee list based upon said ordered list of said plurality of carriers, starting with said least expensive to said most expensive of said plurality of carriers for each said ported number; and
  wherein when said least expensive of said plurality of carriers is unavailable, placing said telephone call to a next one of said plurality of carriers on said ordered list, from said least expensive to said most expensive of said plurality of carriers; and at least one processor which executes the program.

2. The apparatus of claim 1, wherein said telephone conferencing controller accesses a national database or a copy of ported numbers from said national database, to determine whether said telephone number is ported.

3. The apparatus of claim 1, wherein said telephone conferencing controller accesses a database to locate pricing of telephone calls for each of said plurality of carriers.

4. The apparatus of claim 1, wherein said database is located with a corresponding one of each of said plurality of carriers.

5. The apparatus of claim 2, wherein accessing said national database or another database, is performed prior to said telephone call or in real-time.

6. The apparatus of claim 2, wherein when said telephone number is not a ported number, and is based on a dialed number, charges for said telephone call are based on least-cost-routing.

7. The apparatus of claim 2, wherein said national database is accessed in real-time.

8. The apparatus of claim 1, wherein said ported number is ported from one of a land line to a mobile phone, one carrier to another carrier, or from one carrier in one geographic area to another geographic area.

9. The apparatus of claim 1, wherein said telephone number is identified as ported based upon its location routing number.

10. The apparatus of claim 3, wherein when said pricing is not stored in said database, said database of each of said plurality of carriers is searched in real-time for said pricing.

11. The apparatus of claim 10, wherein a cost for said telephone call is based upon one of a predetermined charge, a dialed number, or a predetermined number of digits of said telephone number.

12. The apparatus of claim 1, wherein said plurality of carriers charge based upon one of a dialed number, said ported number, or a flat rate.

13. The apparatus of claim 12, wherein said teleconferencing controller analyzes a cost of said telephone call, said analysis which is performed in a predetermined order.

14. The apparatus of claim 1, wherein when the number is ported, the teleconferencing controller divides the plurality of carriers into groups, the groups which provide a predetermined cost to call each ported number.

15. The apparatus of claim 14, wherein the teleconferencing controller creates the list of said plurality of carriers and arranges the list of said plurality of carriers in order based upon cost within each group, from least expensive to most expensive, for the call.

16. The apparatus of claim 15, wherein the teleconferencing controller creates a single merged list of said plurality of carriers from said groups ordered by cost, from least expensive to most expensive; and then places said telephone call to each conferee on said conferee list based upon said merged list of said plurality of carriers, starting with said least expensive to said most expensive of said plurality of carriers for each said ported number.

17. The apparatus of claim 16, wherein said merged list of said plurality of carriers from said groups is created in order by cost, such that said telephone call is placed in parallel processes, based upon said order by cost, and based upon availability of said plurality of carriers at a time of said telephone call.

18. The apparatus of claim 17, wherein when one of said plurality of carriers is unavailable, said teleconferencing controller proceeds to a next one of said plurality of carriers in order of cost, from cheapest to most expensive.

19. The apparatus of claim 18, wherein said teleconferencing controller stops at a predetermined one of said plurality of carriers.

20. The apparatus of claim 17, wherein said merged list is prepared in advance of said telephone conference call.

21. The apparatus of claim 17, wherein said merged list is prepared in real-time during said telephone call.

22. A method of performing advanced call routing in a mass telephone conference call, comprising:
 using a telephone conferencing controller which contains a memory having a software program to perform the following steps:
  checking a conferee list that includes a plurality of telephone numbers to determine whether a telephone number in the conferee list is a ported number;
  creating a list of a plurality of carriers for each said ported number on said conferee list, which provides a list of said plurality of carriers for each said ported number;
  arranging the list of said plurality of carriers in order based upon cost, from least expensive to most expensive, for said telephone call;
  placing said telephone call to each conferee on said conferee list based upon said ordered list of said plurality of carriers, starting with said least expensive to said most expensive of said plurality of carriers for each said ported number; and wherein when said least expensive of said plurality of carriers is unavailable, placing said telephone call to a next one of said plurality of carriers on said ordered list, from said least expensive to said most expensive of said plurality of carriers.

23. The method of claim 22, further comprising:
accessing, using said teleconferencing controller, a database to locate pricing of telephone calls for each of said plurality of carriers.

24. The method of claim 22, further comprising:
accessing, using said teleconferencing controller, a national database of ported numbers, to determine whether said telephone number is ported.

25. The method of claim 23, wherein accessing said database is performed prior to said telephone call or in real-time.

26. The method of claim 23, wherein said database is located with a corresponding one of each of said plurality of carriers.

27. The method of claim 24, wherein accessing said national database is performed prior to said telephone call or in real-time.

28. The method of claim 23, wherein when said telephone number is not a ported number, and is based on a dialed number, charges for said telephone call are based on least-cost-routing.

29. The method of claim 24, wherein said national database is accessed in real-time.

30. The method of claim 22, wherein said ported number is ported from one of a land line to a mobile phone, one carrier to another carrier, or from one carrier in one geographic area to another geographic area.

31. The method of claim 22, wherein said telephone number is identified as ported based upon its location routing number.

32. The method of claim 23, wherein when said pricing is not stored in said database, said database of each of said plurality of carriers is searched in real-time for said pricing.

33. The method of claim 32, wherein a cost for said telephone call is based upon one of a predetermined charge, a dialed number, or a predetermined number of digits of said telephone number.

34. The method of claim 22, wherein said plurality of carriers charge based upon one of a dialed number, said ported number, or a flat rate.

35. The method of claim 34, wherein said teleconferencing controller analyzes a cost of said telephone call, said analysis which is performed in a predetermined order.

36. The method of claim 35, wherein said ordered list of said plurality of carriers is created in order by cost, such that said telephone call is placed in parallel processes, based upon said order by cost, and based upon availability of said plurality of carriers at a time of said telephone call.

37. The method of claim 36, wherein when one of said plurality of carriers is unavailable, said teleconferencing controller proceeds to a next one of said plurality of carriers in order of cost, from cheapest to most expensive.

38. The method of claim 37, wherein said teleconferencing controller stops at a predetermined one of said plurality of carriers.

39. The method of claim 38, wherein said ordered list is prepared in advance of said telephone conference call.

40. The method of claim 38, wherein said ordered list is prepared in real-time during said telephone call.

41. The method of claim 22, wherein when the number is ported, first dividing the plurality of carriers into groups, the groups which provide a predetermined cost to call each ported number.

42. The method of claim 41, further comprising performing, using said teleconferencing controller, the steps of creating the list of said plurality of carriers and arranging the list of said plurality of carriers in order based upon cost within each group, from least expensive to most expensive, for the call.

43. The method of claim 42, further comprising creating, using said teleconferencing controller, a single merged list of said plurality of carriers from said groups ordered by cost, from least expensive to most expensive.

44. The method of claim 43, further comprising placing, using said teleconferencing controller, said telephone call to each conferee on said conferee list based upon said merged list of said plurality of carriers, starting with said least expensive to said most expensive of said plurality of carriers for each said ported number.

45. A non-transitory computer readable medium comprising instructions that, when executed by a processor, perform advanced call routing in a mass telephone conference call, comprising the steps of:
checking a conferee list that includes a plurality of telephone numbers to determine whether a telephone number in the conferee list is a ported number;
creating a list of a plurality of carriers for each said ported number on said conferee list, which provides a list of said plurality of carriers for each said ported number;
arranging the list of said plurality of carriers in order based upon cost, from least expensive to most expensive, for said telephone call;
placing said telephone call to each conferee on said conferee list based upon said ordered list of said plurality of carriers, starting with said least expensive to said most expensive of said plurality of carriers for each said ported number; and
wherein when said least expensive of said plurality of carriers is unavailable, placing said telephone call to a next one of said plurality of carriers on said ordered list, from said least expensive to said most expensive of said plurality of carriers.

* * * * *